Patented July 31, 1945

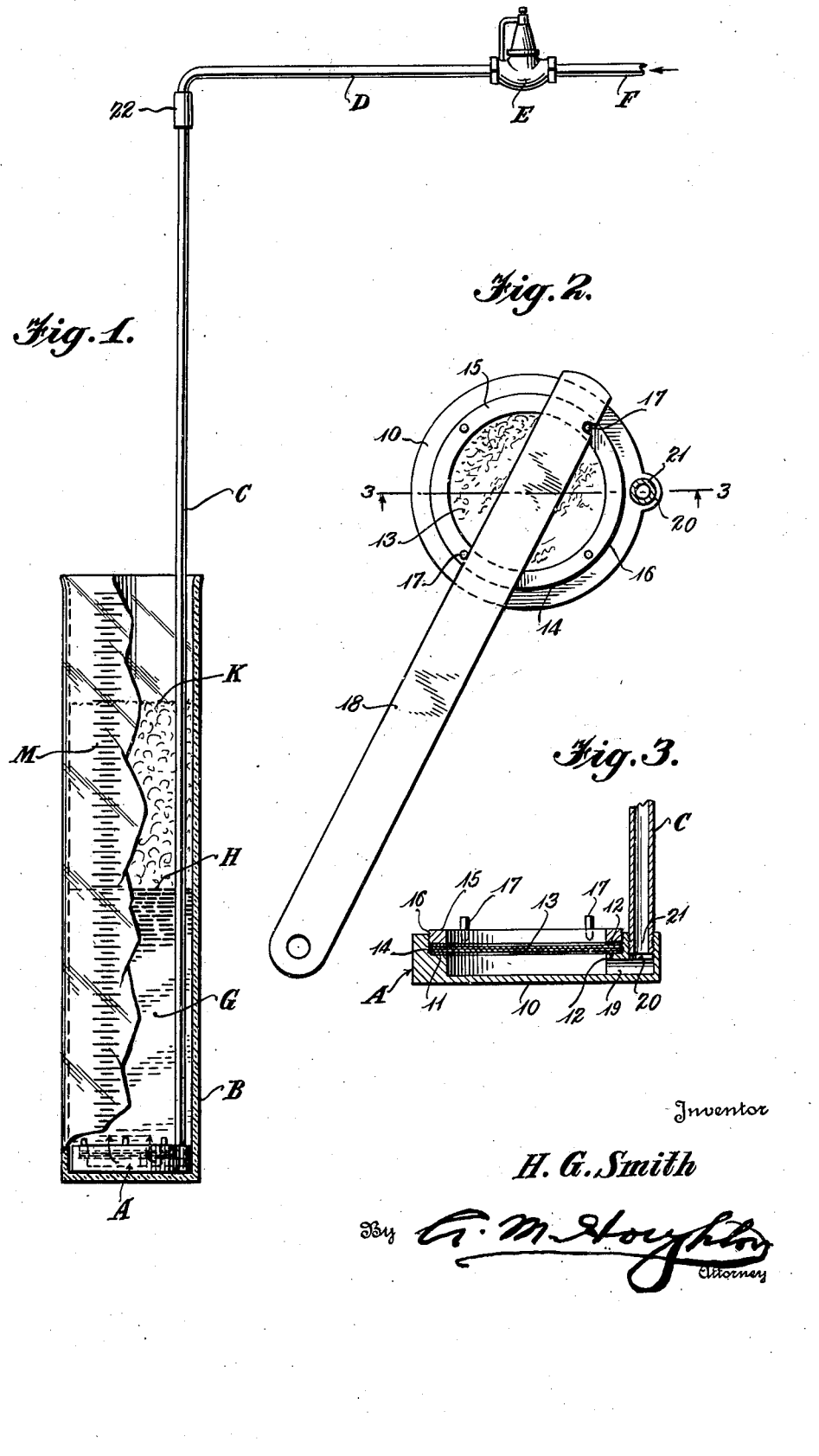

2,380,679

UNITED STATES PATENT OFFICE 2,380,679

APPARATUS FOR TESTING THE FOAMING CHARACTERISTICS OF LIQUIDS

Herschel G. Smith, Wallingford, Pa., assignor to Gulf Oil Corporation, Pittsburgh, Pa., a corporation of Pennsylvania Application August 25, 1944, Serial No. 551,230

1 Claim. (Cl. 73—53)

This invention relates to an improved apparatus for testing the foaming characteristics of liquids, particularly oil samples to which various anti-foam agents have been added.

The purpose of such tests is to determine the efficacy of various agents for suppressing or inhibiting frothing and foaming of lubricating oil such as occurs, for example, in the flight of aircraft. Foaming, if excessive, starves the engine of sufficient oil for lubrication and rapidly leads to mechanical failure. Hence, research in this field contemplates testing oil with suitable agents added to it in differing amounts, by blowing or diffusing air or other gaseous fluids through the test sample under controlled conditions, as one such testing procedure.

It is important that two conditions be maintained: First, since additions of the anti-foam agent are relatively small and any adhering mixture from one sample, if carried over to another, would destroy the accuracy of tests in the succeeding one, the porous diffusing surface must be scrupulously clean at the beginning of each test. Second, the diffusing surface should approximate the diameter of the receptacle for the sample so that air diffusing into the body of oil forms minute bubbles which are substantially homogeneously distributed. The apparatus of the present invention fulfills these requirements, for it provides a diffusing diaphragm which is intended to be discarded after a single use, so that laborious cleaning and possible contamination of other samples are avoided. Also, the diaphragm is of such diameter that the air bubbles are released uniformly into practically all of the overlying oil column.

In a general sense the arts describe many methods of producing gas foams in oil. Static methods are those in which the measurements of the foam are made after the foam has been produced often with no reference to the manner of production of the oil aero foam. In dynamic methods, on the other hand, measurements are made while foam is being formed, usually by a current of gas being distributed and passed through the liquid. A static method may comprise the step of forming the foam by an indicated procedure, then observing the rate at which the liquid drains or collects from the foam, the observations being started after cessation of foam formation. In dynamic methods the question of drainage from the foam is focused more on the position of the topmost films.

The present invention is concerned primarily with an improved dynamic method of forming oil gas foam, wherein the effects that are actually measured are either the rate of the rise of the foam in the measuring cylinder or the maximum constant volume of foam obtained when a gas is passed continuously through the oil and foam. Of course it is to be expected that this dynamic type of foam formation would undoubtedly involve some of the principles of static methods, for it is impossible to prevent draining of some liquid from the foam.

In the arts several methods have been devised to accomplish the desired effect. The usual method is to use some form of fritted or sintered glassware air disperser, which contains minute ports through which gas may be passed as fine bubbles into the liquid. This type of apparatus has many disadvantages; the holes become clogged up and difficult to clean, especially if the oil through which gas is being distributed contains a colloidal suspension of some sort. Moreover, the type of fritted glassware on the market today is usually of uneven porosity, the holes varying in size from 5–200 microns pore diameter so that it is difficult to control the rate at which gas is distributed throughout the oil medium.

Similar to the above-mentioned apparatus are a number of porous stone types of distributors which have been used for distributing gas through the oil medium. These porous stones likewise have the disadvantages mentioned above for the fritted or sintered glass type of gas device apparatus.

Approaching the problem from a practical standpoint, applicant has devised an apparatus for accomplishing the distribution of gas through an oil medium so that the above-mentioned disadvantages are overcome. Essentially the improved oil aerating device comprises a holder which may be lowered in a cylinder. This device is so constructed that a filter paper of known porosity may be conveniently placed in a holder in such a manner as to distribute gas throughout the oil medium. This apparatus has the advantage of not clogging up over a period of time, because the individual filter paper disk may be replaced after each use with an inexpensive new one of the same porosity. The filter papers will withstand enough pressure so as to allow air to flow through the filter paper and be distributed in even bubbles in the lower portion of the oil medium, slowly rising through the oil medium to the surface where the bubbles accumulate for a period of time. The porous material is held in the lower portion of the apparatus between two paper gaskets by clamping or screwing a small ring in the bottom container, as is more fully apparent by reference to the accompanying drawing and the following detailed description.

In the drawing:

Fig. 1 is a view partly in section and partly in elevation showing the aerating device lowered into the cylinder;

Fig. 2 is a plan view of the filter holder portion of the aerating device, a portion of the air tube being shown in section, a tool for tightening the clamping ring being shown applied to the holder; and Fig. 3 is a vertical sectional view on the line 3—3 of Fig. 2, the tightening tool being removed.

In the literature there are described many methods for producing foams from liquids as an aggregation of gas bubbles.

Gas contacting or aeration is at times desired for practical purposes, not only for measuring the foaming characteristics of liquids, but also for securing increased efficiency of contacting for reaction of gas with liquid for other purposes, such as for oxidation or acceleration of chemical reactions or interactions. The present apparatus is found superior to any other device so far known for accurate determination of foaming characteristics of a liquid under standard conditions, as well as for effective aeration, oxidation, or other actions of interest between gases and liquids.

For testing of products for commercial purposes two main types of tests for the foaming characteristics of an oil have been employed. One consists of application of high speed beaters or paddles for measuring the probable mechanical development of foam in operation, merely from the air or other gas drawn or whipped into the liquid during the operation; as, for example, the determination of the tendency of an oil to build up foam while in operation in a gear case. Another test of interest involves the determination of foaming characteristics of an oil or other liquid when air is passed into it as extremely fine bubbles, with resultant minimum of agitation tending to break down fragile bubbles, so that the foam will tend to develop with "quiet" increase, with little or no mechanical agitation from stirring or agitating effect from using large bubbles. The ideal condition for such development is to pass the air into the liquid in such a fine state of division as to produce a gradual build-up of foam in quietly rising stage, as otherwise the stirring effect from large bubbles mixing with small bubbles will tend to approach the mechanical whipper test type, but with erratic intermediate results. The last-mentioned type of test is of practical interest as indicating what will happen, for example, in a tank of liquid from and to which the liquid is circulated, the returning liquid bearing air or other gas in very fine state of subdivision, with little or no agitation in the tank. In practice, most actual conditions of operation encountered lie somewhere between the two effects, that of full mechanical agitation and that of absolutely quiet aeration on stream, so that by using both tests we can define the limits in both directions.

The present invention pertains to the purely mechanical development, design, and use of a special non-agitating aerating device which produces reliable effects from the admission to the exposed surface of air or other gas in any desired extremely fine state of subdivision of bubbles. To accomplish this effect I have designed an improved type of aerating apparatus comprising a metallic or other holder of flat disk type to which is connected a round tube to supply air or other gas admitted to the holder, with a clamped-in diaphragm held tightly by suitable gaskets and threaded ring, which may be tightened by a small spanner wrench, in horizontal position relative to the flat disk holder.

For aeration of non-aqueous liquids, such as petroleum oils, for study of foaming characteristics, diaphragms of standard final filter papers may be used, such as Whatman No. 40 filter paper, cut to desired size by a punch type cutter of the same general design employed for cutting washers, or shot gun wads. Disks and washers of other materials can also be cut in the same manner from blotting paper, fine linen, or other suitable materials, where needed. In the case of the use of this same type apparatus for aqueous solutions, or mixtures of water and oil, or the like, where the filter paper itself will soak up the water and will at times be broken by the moderate air or gas pressure employed, due to softening of the fibers, fine linen disks may be used for some work, while a combination of selected very fine filter paper covered by linen disk for additional strength for any desired fine division of gas or air may also be employed where water is present. The regular type of differential capillary tube air meter delivering about 10 liters per hour may be employed for the test, preferably standardized satisfactorily for multiple units, although any suitable air meter can be used, as a matter of convenience. A pressure of around 100 mm. mercury has proved satisfactory for use with present equipment for a preferred type of paper diaphragm for securing the fine bubbles. Thus there is provided flexibility in the operation and selection of materials for this equipment, for carrying out any operation desired along these lines in the way of aeration or reaction of gas with liquids for the purpose of determining foaming characteristics of a liquid, as well as for accelerated reaction tests.

Referring to the drawing, A denotes generally the filter holder which is adapted to be lowered into a graduated cylinder B preferably of glass or like transparent material. The filter holder is provided with an air or gas supply tube C which is detachably secured to the holder and is adapted to supply air or gas under pressure beneath the removable filter paper disk or disks carried by the holder. The vertical supply pipe C may be connected through any suitable means to a source of supply, as, for example, through horizontal pipe D, gas pressure regulator E and supply pipe F, which receives air or gas from a suitable source of pressure, as, for example, a pressure tank or pump (not shown). The graduated cylinder B may be filled with liquid G to a suitable level H, and above the liquid level bubbles will rise when air is supplied through the pipe C to a level K which may be measured upon the scale M carried by the beaker or container B.

The filter holder as shown comprises a dish-like base member 10 which may be composed of any suitable material, as for example, copper, brass or other metal, or of synthetic material, such as plastic resins or the like. The base member is provided with an annular shoulder 11 midway between the bottom and top of the base member upon which one or more gaskets 12 of paper fibre or other suitable material may be placed. Over the gasket 12 one or more disks 13 of porous material, such as filter paper, may be located. Another gasket 12 may be placed over the filter paper disk. The filter paper and gaskets are clamped in place by the use of a suitable clamping ring which is secured into a screw-threaded portion 14 of the base member located above the shoulder 11. The clamping ring 15 is suitably screw-threaded at 16 to correspond with the threads 14 in the base member. In order to tightly clamp the ring a plurality of spaced pins 17 may be provided which are adapted to cooperate with a suitable tool or wrench 18 having a slot therein adapted to engage with one of the pins while the rear of the tool engages a pin on the opposite side of the ring while the handle portion of the tool extends beyond the holder and may be grasped by the operator.

Below the shoulder member 11 of the base portion is a horizontal opening or passage 19 which communicates with vertical passage 20 which is suitably screw-threaded to receive correspondingly threaded lower portion 21 of the air pipe C. The pipe C may be provided with a suitable connecting nipple 22 at the upper portion thereof, by which the vertical pipe is connected to the lateral pipe D.

Operation

While it will be obvious that the foam testing operation may be carried out under varying conditions, a particular test under specified conditions will now be described:

The test was conducted in a room having a temperature of about 77° F. The temperature of the room should not be lower than about 70° F. A circle of Whatman No. 40 filter paper or its equivalent 1¼ inches in diameter was inserted between two paper gaskets 12, 12 having an inner diameter of 1⅜ inches and an outer diameter of 1¼ inches. The clamping ring 15 was screwed into place and tightened by means of the wrench 18. The assembled aerator was then inserted into a 1000-cc. cylinder so that the bottom of the aerating device rested in the bottom of the cylinder. A portion of the sample of oil to be tested, previously adjusted to approximately 77° F., was poured into the cylinder until the 250-cc. mark was reached, allowing 20 ccs. as the approximate displacement volume of the aerator in actual operation. The aerating device was then connected to the air line running from an air flow gauge. The air supply was then turned on and the pressure adjusted so that the air rate of flow was approximately 10 liters per hour. After ten minutes agitation the air was turned off. The volumes of oil and foam, as indicated by the graduation marks on the 1000-cc. cylinder, were then read. The ratio of oil and foam to oil sample is as follows:

$$\frac{v-20}{230} = \text{ratio of oil and form to oil}$$

where $v =$ volume of oil and foam as indicated by the graduation marks on the cylinder.

Obviously the apparatus may be used under other operating conditions, but effective results have been obtained when operating as above described. The time required to complete the test, when conducted by an experienced operator, is from ten to twenty minutes.

What I claim is:

Apparatus for testing the foaming characteristics of liquid comprising in combination with a measuring receptacle a separate, removable, dished base member adapted substantially to cover the bottom of said receptacle when positioned therein, an internal annular shoulder formed in the peripheral wall of said dished base member, a discardable filter disk of thin, sheet material supported on said shoulder, a ring threaded into said holder for clamping the disk in position, a pipe for gaseous fluids secured to said peripheral wall and communicating with a passageway leading to the enclosed space beneath said filter disk, said pipe being thereby removed from a position centrally of the body of liquid in said measuring receptacle in the path of rising bubbles from said filter disk, to minimize the adherence of bubbles thereto, and said filter disk being of large diameter or compared to that of the measuring receptacle, whereby bubbles rising through the body of liquid under test are substantially homogeneously distributed therethrough.

HERSCHEL G. SMITH.